US007590060B2

(12) United States Patent
Miceli

(10) Patent No.: US 7,590,060 B2
(45) Date of Patent: Sep. 15, 2009

(54) NETWORK CONGESTION RECOGNITION AND MANAGEMENT

(75) Inventor: Sean Miceli, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 393 days.

(21) Appl. No.: 11/736,451

(22) Filed: Apr. 17, 2007

(65) Prior Publication Data

US 2007/0189167 A1    Aug. 16, 2007

Related U.S. Application Data

(63) Continuation-in-part of application No. 11/051,674, filed on Feb. 4, 2005.

(51) Int. Cl.
*H04L 12/26* (2006.01)
(52) U.S. Cl. .................. 370/230; 370/412; 370/429
(58) Field of Classification Search ......... 370/230–235, 370/412–418, 428–429; 709/235–239
See application file for complete search history.

(56) References Cited

U.S. PATENT DOCUMENTS

| 5,748,900 | A | | 5/1998 | Scott et al. |
| 6,144,637 | A | * | 11/2000 | Calvignac et al. ........... 370/229 |
| 6,198,724 | B1 | * | 3/2001 | Lam et al. ................... 370/233 |
| 6,456,591 | B1 | | 9/2002 | Mishra |
| 6,625,118 | B1 | | 9/2003 | Hadi Salim et al. |
| 7,023,800 | B1 | | 4/2006 | McAuley et al. |
| 7,106,752 | B2 | * | 9/2006 | Yamada ...................... 370/412 |
| 7,110,411 | B2 | * | 9/2006 | Saidi et al. ................ 370/395.4 |
| 7,558,197 | B1 | * | 7/2009 | Sindhu et al. ............... 370/230 |

OTHER PUBLICATIONS

Sally Floyd, "TCP and Explicit Congestion Notification", ACM SIGCOMM Computer Communication Review, Oct. 1994, pp. 8-23.
Kohler, et al., "Designing DCCP: Congestion Control Without Reliability", SIGCOMM '06, Sep. 11-15, 2006, pp. 27-38.

* cited by examiner

*Primary Examiner*—William Trost, IV
*Assistant Examiner*—Mewale Ambaye

(57) ABSTRACT

Apparatus for managing bandwidth for a plurality of connections each having a respective connection token, the apparatus having corresponding methods and computer-readable media, comprises a memory to store the connection tokens, the memory comprising a ready connection queue, a pending increase connection queue, and an increase connection queue; and a controller to move connection tokens in the ready connection queue to the pending increase connection queue when bandwidth for the respective connections should be increased; wherein the controller moves connection tokens in the pending increase connection queue to the increase connection queue, and increases bandwidth for the respective connections, when a number of the connection tokens in the increase connection queue is less than a predetermined maximum number; and wherein the controller moves connection tokens in the increase connection queue to the ready connection queue when bandwidth for the respective connections should be decreased.

20 Claims, 9 Drawing Sheets

NETWORK CONGESTION RECOGNITION AND MANAGEMENT

CROSS-REFERENCE TO RELATED APPLICATIONS

This application is a continuation-in-part of U.S. Non-Provisional Patent Application Ser. No. 11,051,674, filed Feb. 4, 2005, the disclosure thereof incorporated by reference herein in its entirety.

BACKGROUND

The present invention relates generally to bandwidth control for digital data transmission. More particularly, the present invention relates to network congestion recognition and management.

Multimedia communications channels such as those used in Internet videoconferencing generally employ the user datagram protocol (UDP) to transport packets of video data. Because UDP does not support the retransmission of lost packets, it is well-suited to real-time data transmission. The delay required for the retransmission of a lost packet in a real-time multimedia communications channel would produce a noticeable fault at the receiver such as frozen video and clicks in the audio.

However, UDP is a connectionless protocol, and so presents a network security issue. Many businesses will not permit UDP connections to traverse their corporate firewalls, and so cannot use UDP videoconferencing systems.

However, another transport protocol is available, namely transmission control protocol (TCP). But TCP retransmits lost packets, and so is generally not well-suited for real-time multimedia communications. TCP also provides network congestion control by effectively changing the bandwidth of the communications channel, lowering the bandwidth of each channel on a congested network connection to allow all of the channels to share the network connection. This congestion control can adversely affect multimedia communications. For example, if a videoconferencing application is transmitting at a bandwidth greater than that permitted by TCP congestion control, a growing transmission lag will result. If the difference in bandwidths is 10%, then at the end of a one-hour videoconference the lag will be 6 minutes, hardly real-time.

SUMMARY

In general, in one aspect, the invention features an apparatus for managing bandwidth for a plurality of connections each having a respective connection token, the apparatus comprising: a memory to store the connection tokens, the memory comprising a ready connection queue, a pending increase connection queue, and an increase connection queue; and a controller to move connection tokens in the ready connection queue to the pending increase connection queue when bandwidth for the respective connections should be increased; wherein the controller moves connection tokens in the pending increase connection queue to the increase connection queue, and increases bandwidth for the respective connections, when a number of the connection tokens in the increase connection queue is less than a predetermined maximum number; and wherein the controller moves connection tokens in the increase connection queue to the ready connection queue when bandwidth for the respective connections should be decreased.

In some embodiments, the memory stores priority levels for each of the connections; and the controller moves the connection tokens based on the priority levels of the respective connections. In some embodiments, the controller decreases bandwidth, and moves connection tokens to the ready connection queue, when the respective connections are congested. In some embodiments, the controller determines whether the connections are congested. In some embodiments, to determine whether one of the connections is congested, the controller transmits, over the one of the connections, a pair of packets separated by a first interval; and the controller determines a second interval between reception of the pair of packets, determines a difference between the first and second intervals, and determines a congestion level based on the difference.

In general, in one aspect, the invention features an apparatus for managing bandwidth for a plurality of connections each having a respective connection token, the apparatus comprising: memory means for storing the connection tokens, the memory comprising a ready connection queue, a pending increase connection queue, and an increase connection queue; and controller means for moving connection tokens in the ready connection queue to the pending increase connection queue when bandwidth for the respective connections should be increased; wherein the controller means moves connection tokens in the pending increase connection queue to the increase connection queue, and increases bandwidth for the respective connections, when a number of the connection tokens in the increase connection queue is less than a predetermined maximum number; and wherein the controller means moves connection tokens in the increase connection queue to the ready connection queue when bandwidth for the respective connections should be decreased. In some embodiments, the memory means stores priority levels for each of the connections; and the controller means moves the connection tokens based on the priority levels of the respective connections. In some embodiments, the controller means decreases bandwidth, and moves connection tokens to the ready connection queue, when the respective connections are congested. In some embodiments, the controller means determines whether the connections are congested. In some embodiments, to determine whether one of the connections is congested, the controller means transmits, over the one of the connections, a pair of packets separated by a first interval; and wherein the controller means determines a second interval between reception of the pair of packets, determines a difference between the first and second intervals, and determines a congestion level based on the difference.

In general, in one aspect, the invention features a method for managing bandwidth for a plurality of connections each having a respective connection token, the method comprising: providing a ready connection queue, a pending increase connection queue, and an increase connection queue; moving connection tokens in the ready connection queue to the pending increase connection queue when bandwidth for the respective connections should be increased; moving connection tokens in the pending increase connection queue to the increase connection queue, and increasing bandwidth for the respective connections, when a number of the connection tokens in the increase connection queue is less than a predetermined maximum number; and moving connection tokens in the increase connection queue to the ready connection queue when bandwidth for the respective connections should be decreased.

Some embodiments comprise maintaining priority levels for each of the connections; and moving the connection tokens based on the priority levels of the respective connections. Some embodiments comprise decreasing bandwidth, and moving connection tokens to the ready connection queue, when the respective connections are congested. Some embodiments comprise determining whether the connections are congested. Some embodiments comprise causing transmission, over one of the connections, of a pair of packets separated by a first interval; and determining a second interval between reception of the pair of packets; and determining a difference between the first and second intervals.

In general, in one aspect, the invention features computer-readable media embodying instructions executable by a computer to perform a method for managing bandwidth for a plurality of connections each having a respective connection token, the method comprising: providing a ready connection queue, a pending increase connection queue, and an increase connection queue; moving connection tokens in the ready connection queue to the pending increase connection queue when bandwidth for the respective connections should be increased; moving connection tokens in the pending increase connection queue to the increase connection queue, and increasing bandwidth for the respective connections, when a number of the connection tokens in the increase connection queue is less than a predetermined maximum number; and moving connection tokens in the increase connection queue to the ready connection queue when bandwidth for the respective connections should be decreased.

In some embodiments, the method further comprises: maintaining priority levels for each of the connections; and moving the connection tokens based on the priority levels of the respective connections. In some embodiments, the method further comprises: decreasing bandwidth, and moving connection tokens to the ready connection queue, when the respective connections are congested. In some embodiments, the method further comprises: determining whether the connections are congested. In some embodiments, the method further comprises: causing transmission, over one of the connections, of a pair of packets separated by a first interval; and determining a second interval between reception of the pair of packets; and determining a difference between the first and second intervals.

The details of one or more implementations are set forth in the accompanying drawings and the description below. Other features will be apparent from the description and drawings, and from the claims.

Figure 1:
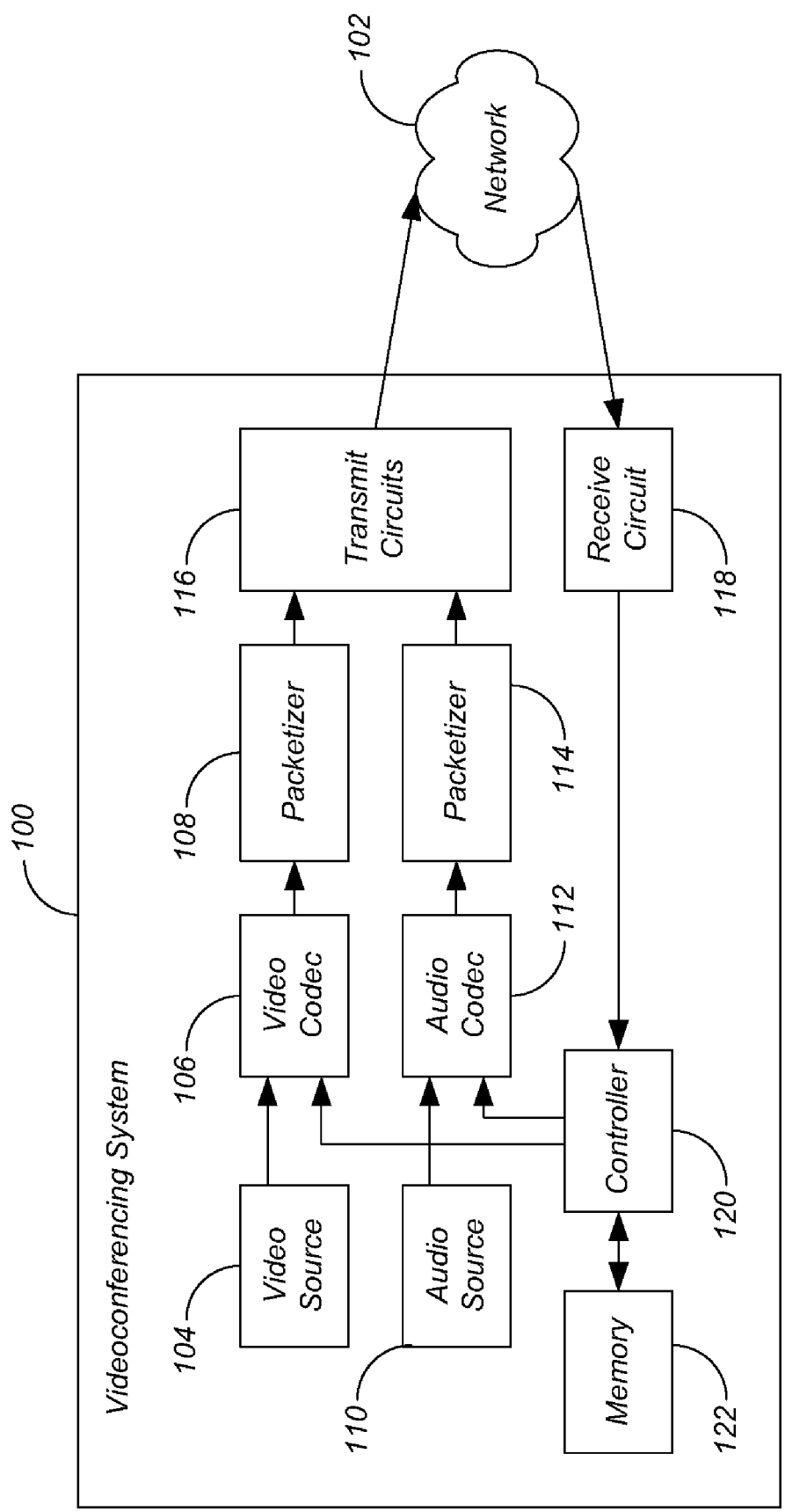
FIG. 1 shows a videoconferencing system in communication with a network such as the Internet.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Embodiments of the present invention provide network congestion recognition and management. The techniques disclosed herein are especially useful in real-time applications such as videoconferencing and voice-over-IP telephony, but are also applicable to communications channels with less stringent latency requirements.

FIG. 1 shows a videoconferencing system 100 in communication with a network 102 such as the Internet. But while embodiments of the present invention are described with respect to network videoconferencing, the techniques disclosed herein are equally applicable to other sorts of one-way and two-way communications applications.

Videoconferencing system 100 comprises a video source 104 that provides a video signal, for example from a videoconferencing camera, a video codec 106 to encode the video signal as video data, and a video packetizer 108 to produce TCP packets of the video data. Videoconferencing system 100 further comprises an audio source 110 that provides an audio signal, for example from a microphone, an audio codec 112 to encode the audio signal as audio data, and an audio packetizer 114 to produce TCP packets of the audio data. Videoconferencing system 100 further comprises a plurality of transmit circuits 116 such as Ethernet ports to transmit the video and audio TCP packets, one or more receive circuits 118 to receive data and control packets from network 102, a controller 120 to control videoconferencing system 100, and a memory 122.

Transmit circuits 116 can maintain a plurality of connections over network 102 concurrently. For example, each connection can be a TCP connection or the like. The connections can include connections for transmitting video data, audio data documents, control data, and the like.

Figure 2:
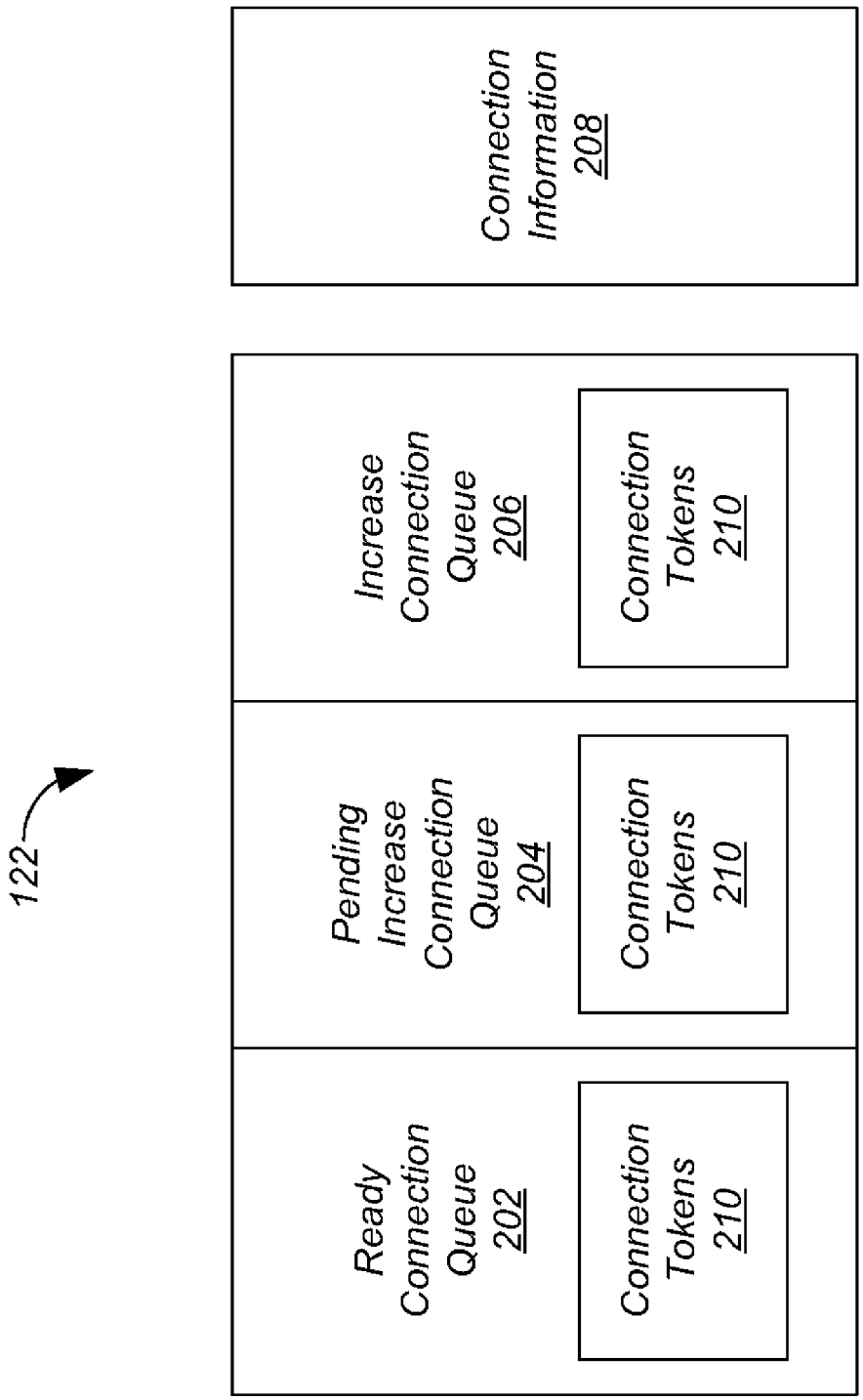
FIG. 2 shows the contents of the memory of FIG. 1 according to some embodiments of the present invention.

Controller 120 uses memory 122 to manage the connections. FIG. 2 shows the contents of memory 122 according to some embodiments of the present invention. Referring to FIG. 2, memory 122 stores connection information 208 for each connection. Connection information 208 can include an identifier for each connection, a state of each connection, a number of packets transmitted by videoconferencing system 100 over each connection, and the like. Memory 122 also stores connection tokens 210, each representing one of the connections, in three connection queues: a ready connection queue 202, a pending increase connection queue 204, and an increase connection queue 206. These three queues 202, 204, 206 are used to manage the bandwidth of the connections, as described in detail below.

To summarize, controller 120 employs queues 202, 204, 206 as follows. Controller 120 moves connection tokens 210 in ready connection queue 202 to pending increase connection queue 204 when bandwidth for the respective connections should be increased. Controller 120 also moves connection tokens 210 in pending increase connection queue 204 to increase connection queue 206, and increases bandwidth for the respective connections, when a number of the connection tokens in increase connection queue 206 is less than a predetermined maximum number. Controller 120 also moves connection tokens 210 in increase connection queue 206 to ready connection queue 202 when bandwidth for the respective connections should be decreased. Controller 120 also decreases bandwidth, and moves connection tokens 210 to ready connection queue 202, when the respective connections are congested.

FIGS. 3-9 show several processes for videoconferencing system 100 of FIG. 1 according to some embodiments of the present invention. Controller 120 can execute some or all of these processes concurrently. Although in the described embodiments, the elements of the processes are presented in one arrangement, other embodiments may feature other arrangements, as will be apparent to one skilled in the relevant arts based on the disclosure and teachings provided herein. For example, in various embodiments, some or all of the steps of the processes can be executed in a different order, concurrently, and the like.

Figure 3:
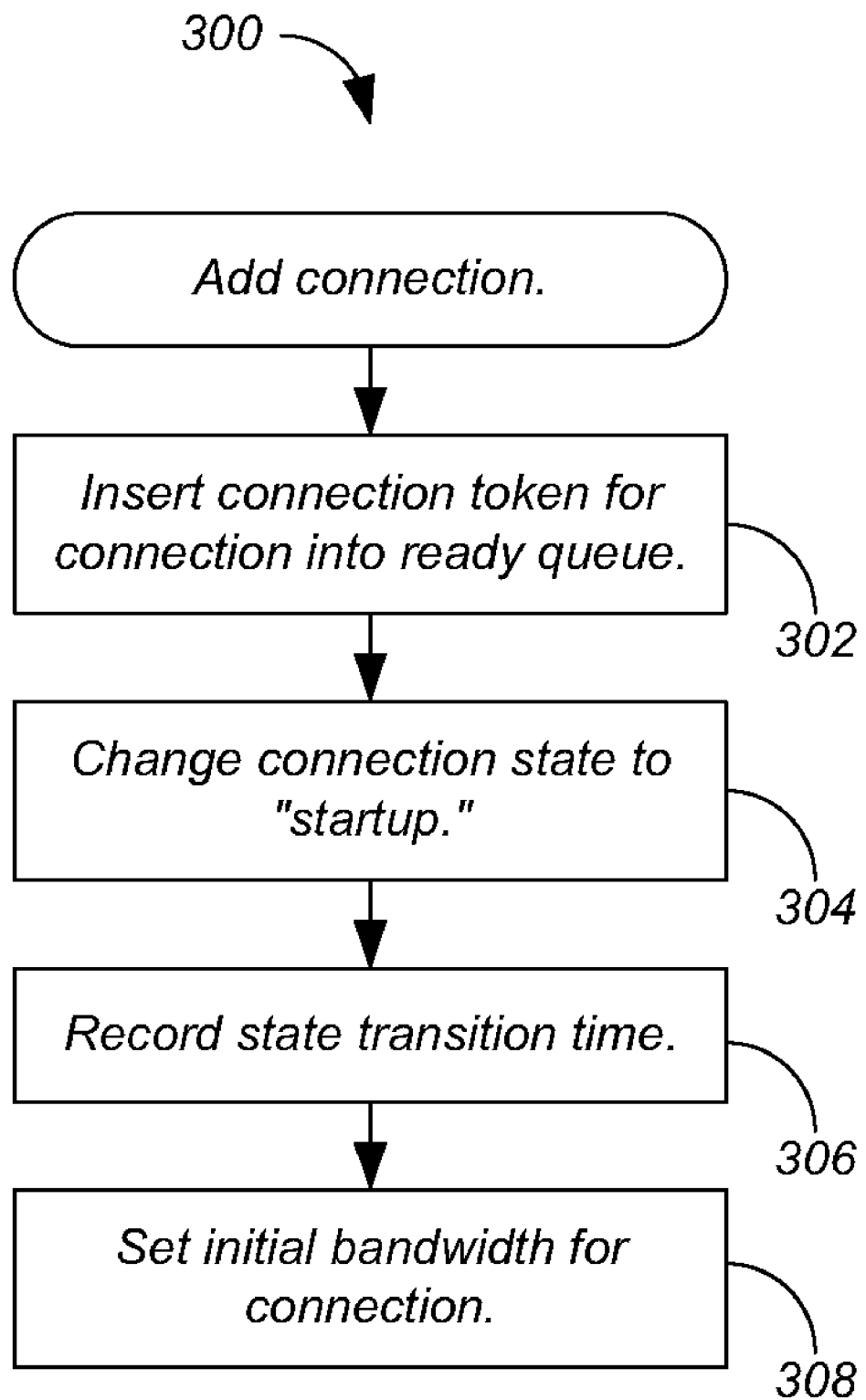
FIG. 3 shows a process for adding a connection according to some embodiments of the present invention.

FIG. 3 shows a process 300 for adding a connection according to some embodiments of the present invention. Referring to FIG. 3, controller 120 inserts a connection token 210 representing the connection into ready connection queue 202 (step 302). In some embodiments, some or all of the connections have a priority level. In these embodiments, controller 120 inserts connection token 210 into ready connection queue 202 according to the priority level of the respective connection.

Controller 120 changes the state of the connection to "startup" in connection information 208 (step 304), and records the state transition time at which the state of the connection was changed to "startup" in connection information 208 (step 306). Controller 120 also sets an initial bandwidth for the connection in connection information 208 (step 308).

Figure 4:
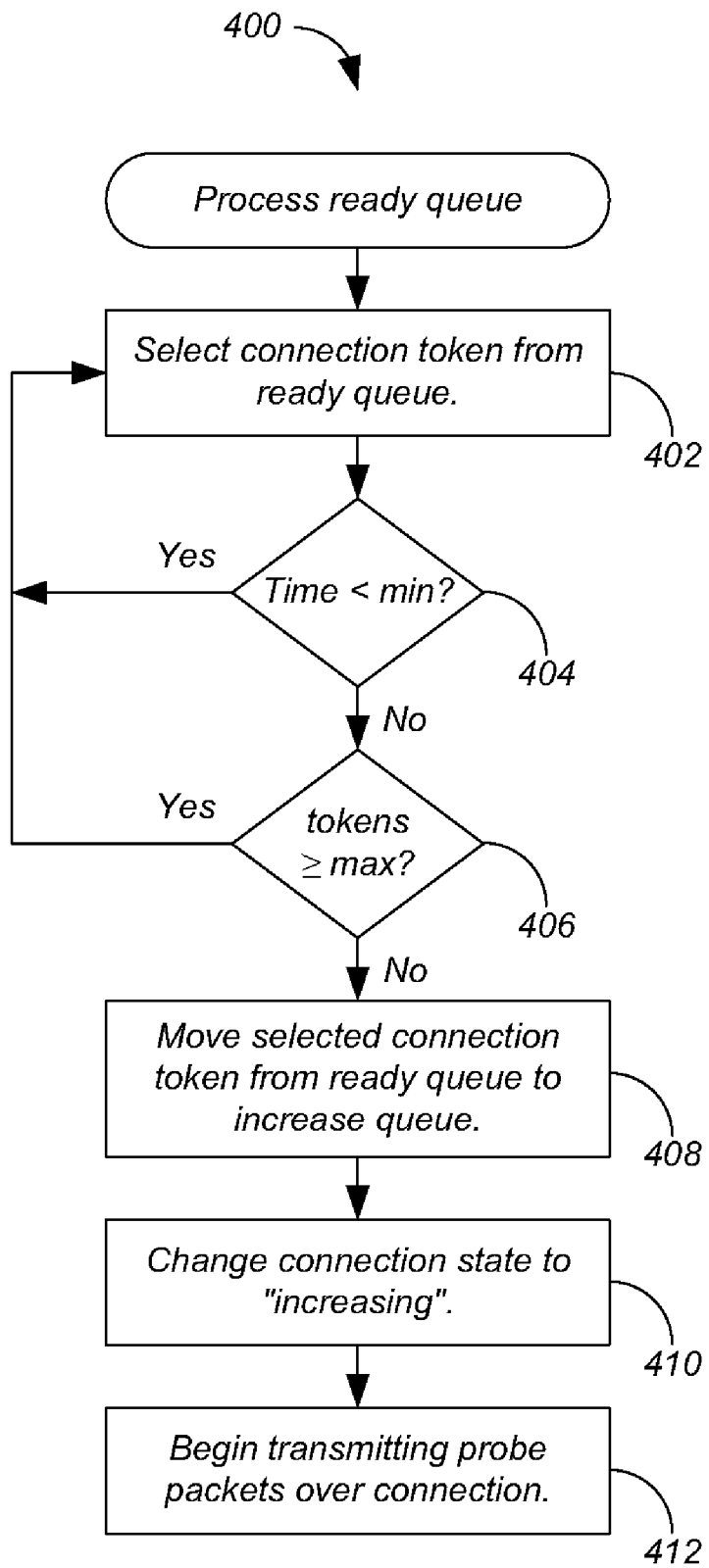
FIG. 4 shows a process for processing the ready connection queue of FIG. 2 according to some embodiments of the present invention.

FIG. 4 shows a process 400 for processing ready connection queue 202 of FIG. 2 according to some embodiments of the present invention. Referring to FIG. 4, controller 120 selects a connection token 210 from ready connection queue 202 (step 402). In embodiments using prioritized connections, controller 120 selects connection token 210 according to the priorities. For example, connection tokens 210 can be arranged in ready connection queue 202 according to priority level.

In some embodiments, a connection token 210 must remain in ready connection queue 202 for a predetermined minimum interval. If the selected connection token 210 has not been in ready connection queue 202 for the predetermined minimum interval (step 404), then controller 120 selects another connection token 210 (step 402).

In some embodiments, a connection token 210 cannot be moved into increase connection queue 206 unless the number of connection tokens 210 is less than a predetermined maximum number. This technique serves to prevent increasing the bandwidth of a large number of connections concurrently, which could lead to network congestion. Referring again to FIG. 4, if the number of connection tokens 210 in increase connection queue 206 is not less than the predetermined maximum number (step 406), then controller 120 selects another connection token 210 (step 402).

Otherwise, controller 120 moves the selected connection token 210 from ready connection queue 202 to increase connection queue 206 (step 408). Controller 120 also changes the state of the connection to "increasing" in connection information 208 (step 410). In some embodiments, controller 120 also causes the respective transmit circuit 116 to begin transmitting probe packets over the connection (step 412). The use of probe packets to determine congestion of network 102 is discussed in detail below.

In some embodiments, the number of packets of data in transit over a connection, that is, the number of the packets of data transmitted by transmit circuit 116 over the connection but not yet received by the receiver of the packets, is used as a measure of congestion of network 102. The number of the packets of the data received by the receiver is obtained from the receiver as a report packet, for example as a Real-time Transport Control Protocol (RTCP) report packet sent by the receiver and received by receive circuit 118. The report packets can be received on a regular basis, for example every two seconds.

Figure 5:
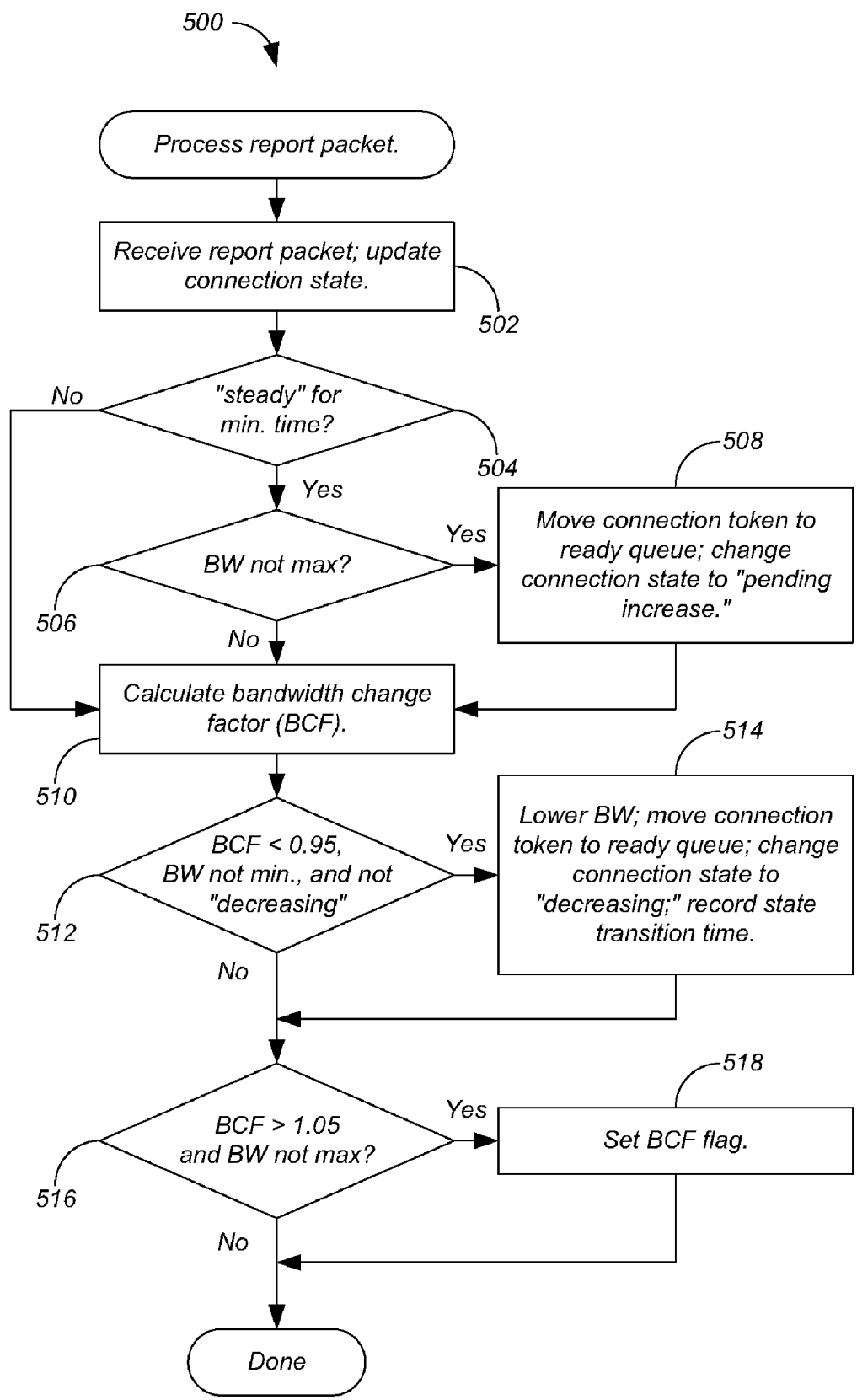
FIG. 5 shows a process for processing a report packet according to some embodiments of the present invention.

FIG. 5 shows a process 500 for processing a report packet according to some embodiments of the present invention. Referring to FIG. 5, after receiving a report packet for a connection, controller 120 first updates the state of the connection (step 502).

Figure 6:
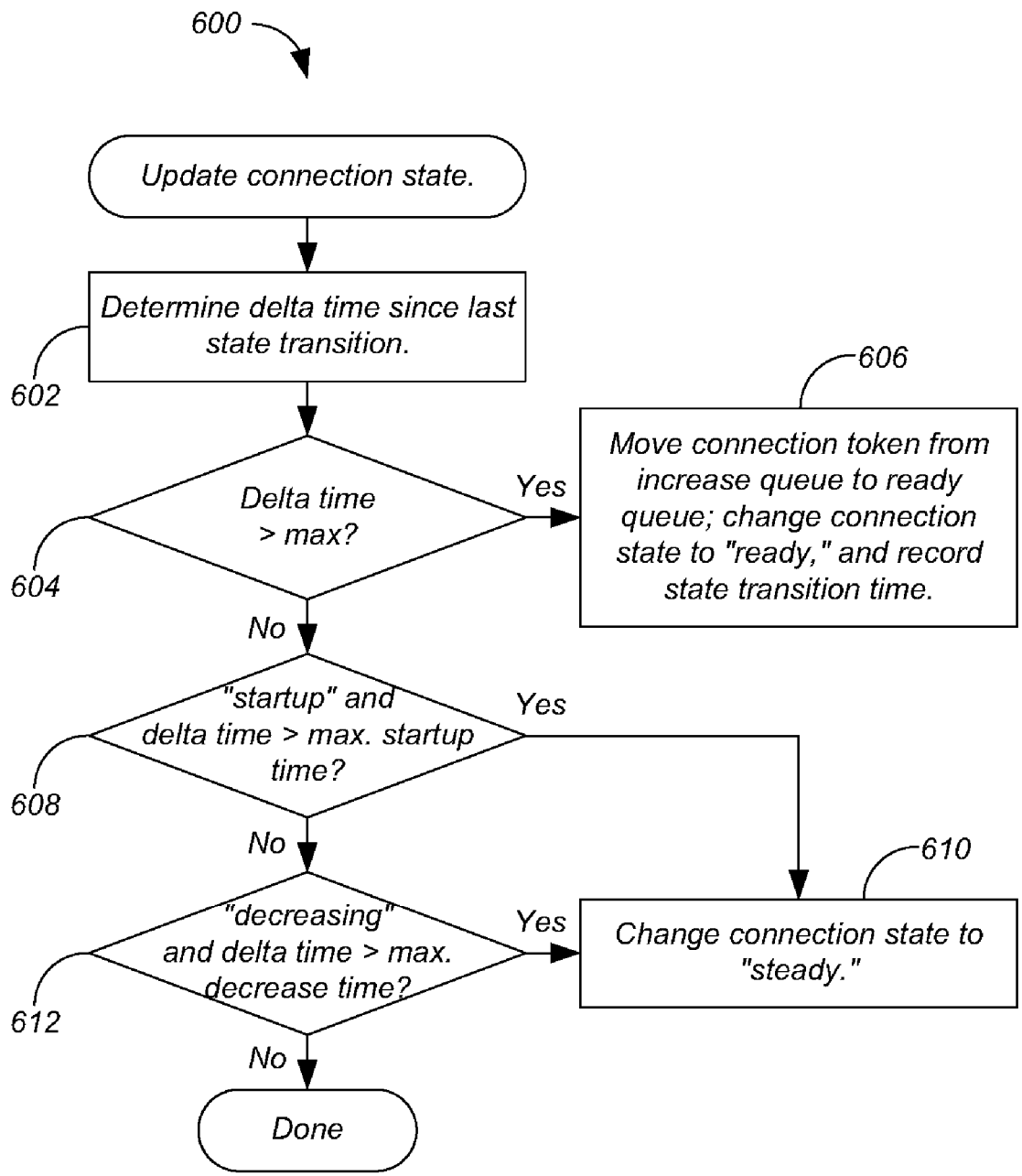
FIG. 6 shows a process for updating the state of a connection according to some embodiments of the present invention.

FIG. 6 shows a process 600 for updating the state of a connection according to some embodiments of the present invention. Referring to FIG. 6, controller 120 determines the delta time that has elapsed since the last state transition for the connection (step 602). If the delta time exceeds a predetermined maximum time (step 604), indicating that the connection token 210 for the connection has been in increase connection queue 206 longer than the predetermined maximum time, controller 120 moves the connection token 210 from increase connection queue 206 to ready connection queue 202, changes the connection state to "ready," and records the state transition time in connection information 208 (step 606).

If the state of the connection is "startup" and the delta time exceeds a maximum startup time (step 608), controller 120 changes the state of the connection to "steady" (step 610).

If the state of the connection is "decreasing" and the delta time exceeds a maximum decrease time (step 612), controller 120 changes the state of the connection to "steady" (step 614).

Returning to FIG. 5, after updating the state of the connection (step 502), if the connection state is "steady," and has been "steady" for a predetermined minimum steady time (step 504), and if the connection bandwidth is not set at maximum (step 506), then controller 120 moves the connection token 210 for the connection to ready connection queue 202, and changes the connection state to "pending increase" (step 508).

Figure 7:
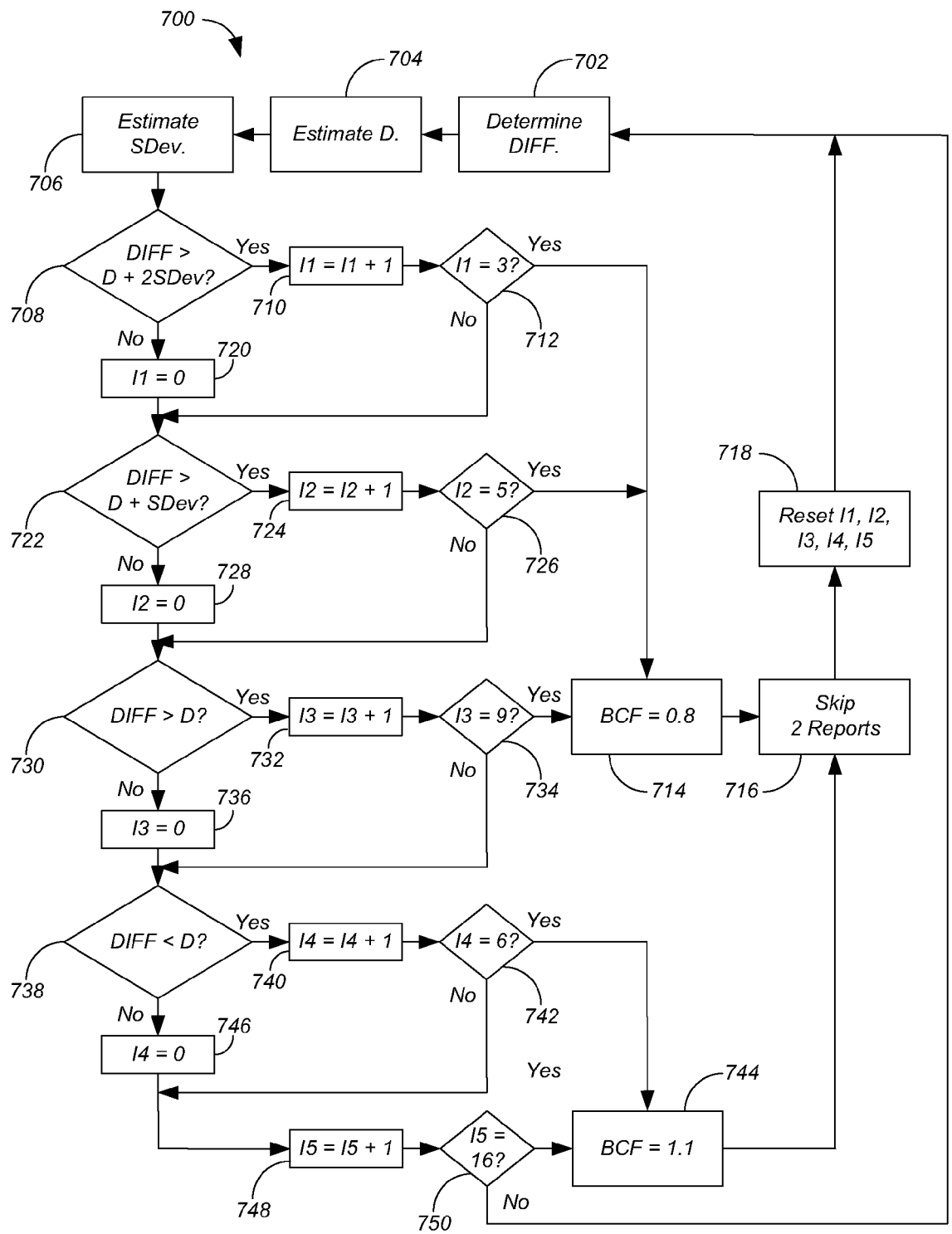
FIG. 7 shows a process for calculating a bandwidth change factor (BCF) for a connection according to some embodiments of the present invention.

Controller 120 then calculates a bandwidth change factor that indicates changes in the bandwidth of the connection (step 510). FIG. 7 shows a process 700 for calculating a bandwidth change factor (BCF) for a connection according to some embodiments of the present invention. Although in the described embodiments, the elements of process 700 are presented in one arrangement, other embodiments may feature other arrangements, as will be apparent to one skilled in the relevant arts based on the disclosure and teachings provided herein. For example, in various embodiments, some or all of the steps of process 700 can be executed in a different order, concurrently, and the like. As another example, the values of the thresholds used in process 700 can be changed to other values.

Referring to FIG. 7, controller 120 determines a difference DIFF between a number of the packets of the data transmitted by transmit circuit 116 and a number of the packets of the data received by the receiver (step 702), preferably over a predetermined interval. The value of DIFF can also be determined by other methods such as calculating the median, the mean, the mode, or some other function of several differences between the number of the packets of the data transmitted by transmit circuit 116 and the number of the packets of the data received by the receiver.

The number of the packets of the data received by the receiver is obtained from the receiver as a report packet, for example as a Real-time Transport Control Protocol (RTCP) receiver report packet sent by the receiver and received by receive circuit 118, as described above. The number of the packets of the data transmitted by videoconferencing system 100 is obtained from videoconferencing system 100. In a preferred embodiment, the reporting interval is two seconds, and the numbers of packets are counted starting with an initialization event, such as the start of the current videoconferencing session.

Controller 120 also estimates the number D of transmitted packets of the data that are in transit over network 102 (step 704). Preferably the estimate D is calculated as the median of the previous 50 values of DIFF, although a different number of values of DIFF can be used, and instead of the median, the mean, the mode or some other function of the values of DIFF can be used.

However, upon initialization an insufficient number of values of DIFF are available. Preferably the first value of DIFF is used until 7 values of DIFF have been calculated. Then the median of all of the values of DIFF is used until 50 values of DIFF have been calculated. Thereafter the sliding window of 50 values of DIFF is used, as described above.

If network 102 is slow, the first few estimates of D might be too large, for example when the initial bandwidth is much greater than the average bandwidth of network 102. Therefore the initial bandwidth is preferably initially limited based on the size S of the average packet of data transmitted by videoconferencing system 100. In a preferred embodiment, if the average packet size exceeds K bits, then the bandwidth is decreased by K/DS until DS<K, where K=40,000. Of course, other values for K can be used.

Process 700 benefits from the stability of the value of D. Therefore, in a preferred embodiment, when a new value of D is calculated, it is compared to the previous value of D. If the new value of D falls inside an estimate window surrounding the previous value of D, then the new value of D is discarded, and the previous value of D is used. Preferably the estimate window is D ± one standard deviation of DIFF. Preferably the standard deviation of DIFF is computed as the median absolute deviation of the previous 50 values of DIFF, although other computation methods can be used.

Process 700 estimates the standard deviation SDev of the packets of data in transit (step 706). Preferably the standard deviation SDev is computed as the median absolute deviation of the previous 50 values of DIFF, although other computation methods can be used. However, upon initialization an insufficient number of values of DIFF are available. Preferably the standard deviation SDev is computed as the average of the highest and lowest values of DIFF until 7 samples of DIFF have been received, although other computation methods can be used. Thereafter the standard deviation SDev is computed as described above.

Process 700 then controls the bandwidth of the data according to the values of DIFF and D. In particular, process 700 decreases the bandwidth when M consecutive values of DIFF fall above a threshold that is a function of D and increases the bandwidth when N consecutive values of DIFF fall below a threshold that is a function of D. Multiple thresholds can be used, as described in detail below.

Process 700 maintains a counter I for each threshold. For four thresholds, process 700 maintains counters I1, I2, I3, and I4. Process 700 also preferably maintains a counter I5 to count the number of receiver reports for which no bandwidth adjustments are made.

If a value of DIFF exceeds the sum of the value of D and twice the standard deviation SDev (step 708), then controller 120 increments counter I1 (step 710). If I1=3, meaning DIFF>D+2SDev for three consecutive receiver reports (step 712), then controller 120 sets the bandwidth change factor to BCF=0.8 (step 714). Of course, other values for BCF can be used.

After changing the bandwidth, and before making another estimate of the number of packets of data in transit, process 700 waits for a predetermined interval, preferably by skipping 2 receiver reports (step 718). Process 700 also resets all of the counters I1, I2, I3, I4, and I5 after changing the bandwidth (step 718). Process 700 then resumes at step 702.

However, if at step 708 DIFF<D+2SDev, counter I1 is reset to zero (step 720) to ensure that counter I1 counts only consecutive receiver reports where DIFF>D+2SDev.

If a value of DIFF exceeds the sum of the value of D and the standard deviation SDev (step 722), then controller 120 increments counter I2 (step 724). If I2=5, meaning DIFF>D+SDev for five consecutive receiver reports (step 726), then controller 120 sets the bandwidth change factor to BCF=0.8 (step 714), skips 2 reports (step 716), and resets counters I (step 718). Process 700 then resumes at step 702. Of course, other values for BCF can be used.

However, if at step 722 DIFF≦D+SDev, counter I2 is reset to zero (step 728) to ensure that counter I2 counts only consecutive receiver reports where DIFF>D+SDev.

If a value of DIFF exceeds the value of D (step 730), then controller 120 increments counter I3 (step 732). If I3=9, meaning DIFF>D for nine consecutive receiver reports (step 734), then controller 120 decreases the bandwidth (step 714), skips 2 reports (step 716), and resets counters I (step 718). Process 700 then resumes at step 702. Preferably the decrease is 20%, although other values can be used.

However, if at step 730 DIFF≦D, counter I3 is reset to zero (step 736) to ensure that counter I3 counts only consecutive receiver reports where DIFF>D.

If a value of DIFF is below the value of D (step 738), then controller 120 increments counter I4 (step 740). If I4=6, meaning DIFF<D for six consecutive receiver reports (step 742), then controller 120 sets the bandwidth change factor to BCF=1.1 (step 744), skips 2 reports (step 716), and resets counters I (step 718). Process 700 then resumes at step 702. Of course, BCF can be set to other values.

However, if at step 738 DIFF≧D, counter I4 is reset to zero (step 746) to ensure that counter I4 counts only consecutive receiver reports where DIFF<D.

To ensure that the bandwidth does not stabilize at an unnecessarily low value, if no changes to the bandwidth are made for J consecutive values of DIFF (that is, for J receiver report packets), then controller 120 increases the bandwidth. Preferably J=16 and the increase is 10%, although other values can be used. Therefore when no bandwidth adjustment is made for a receiver report, process 700 increments counter I5 (step 748). If I5=16, meaning no bandwidth adjustment has been made for 16 consecutive receiver reports (step 750), then controller 120 sets the bandwidth change factor to BCF=1.1 (step 744), skips 2 receiver reports (step 716), and resets counters I (step 718). Of course, BCF can be set to other values. Otherwise process 700 resumes with step 702.

Preferably process 700 includes a burst detection routine to handle bursts of data, for example when an i-frame of video data is to be sent when the video includes significant motion.

When such a burst occurs, controller 120 halves the bandwidth, and maintains that value for 3 receiver report packets before resuming process 700.

Referring again to FIG. 5, after calculating the bandwidth change factor (BCF) for the connection (step 510), controller 120 tests the value of BCF. If BCF<0.95, the bandwidth for the connection is not at a minimum level, and the state of the connection is not "decreasing" (step 512), controller 120 lowers the bandwidth for the connection, moves the connection token 210 for the connection to ready connection queue 202, changes the state of the connection to "decreasing," and records the state transition time (step 514).

If BCF>1.05 and the bandwidth is not at a maximum level (step 516), controller 120 sets a BCF flag in memory 122 (step 518). The use of the BCF flag is described in detail below.

Figure 8:
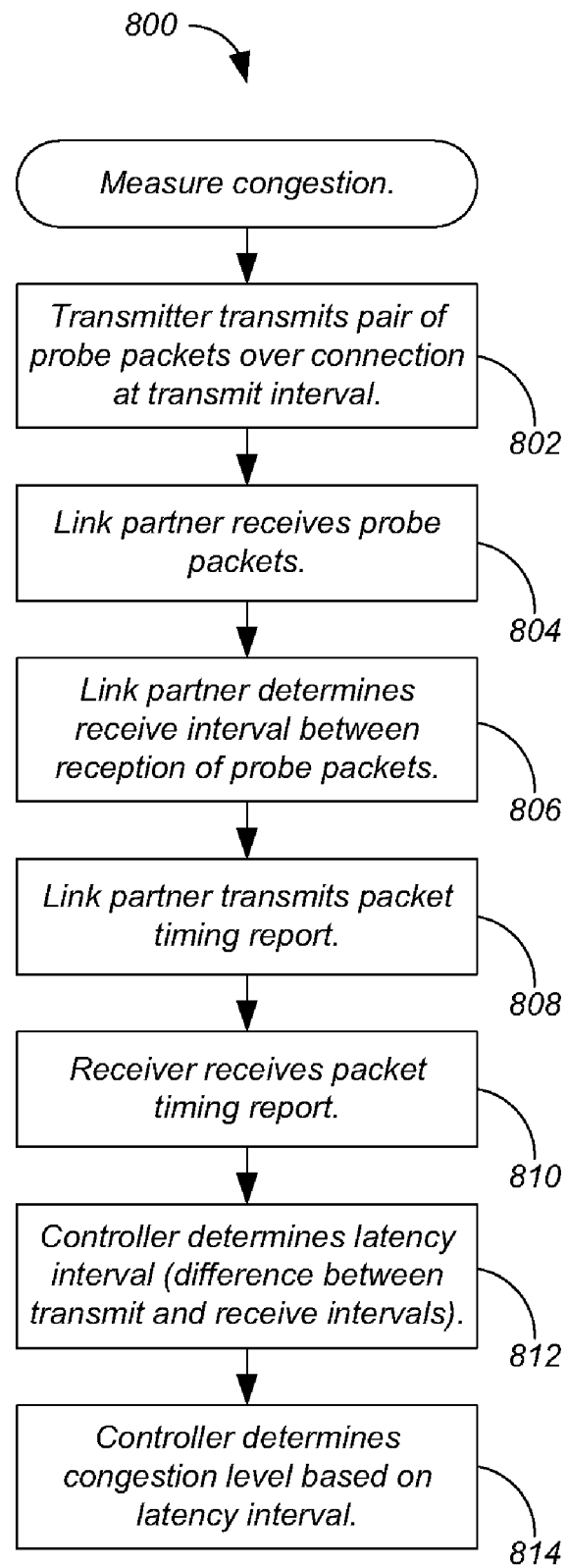
FIG. 8 shows a process for measuring network congestion using probe packets according to some embodiments of the present invention.

As mentioned above, probe packets are used to measure congestion in network 102. FIG. 8 shows a process 800 for measuring congestion of network 102 using probe packets according to some embodiments of the present invention. Controller 120 causes transmit circuit 116 to transmit a pair of probe packets over the connection to be measured (step 802). The pair of probe packets are separated by a transmit interval. Packets of videoconference data can be used as probe packets by marking the packets, for example by setting a flag in the packet header. Alternatively, transmit circuit 116 can generate and transmit a special-purpose probe packet.

A link partner receives the pair of probe packets (step 804) and determines a receive interval between reception of the pair of probe packets (step 806). The link partner reports the receive interval to receive circuit 118 of videoconferencing system 100 in a packet timing report (step 808). Receive circuit 118 of videoconferencing system 100 receives the packet timing report (step 810). Controller 120 of videoconferencing system 100 determines a latency interval as the difference between the transmit and receive intervals (step 812), and can determine a congestion level based on the latency interval (step 814).

Figure 9:
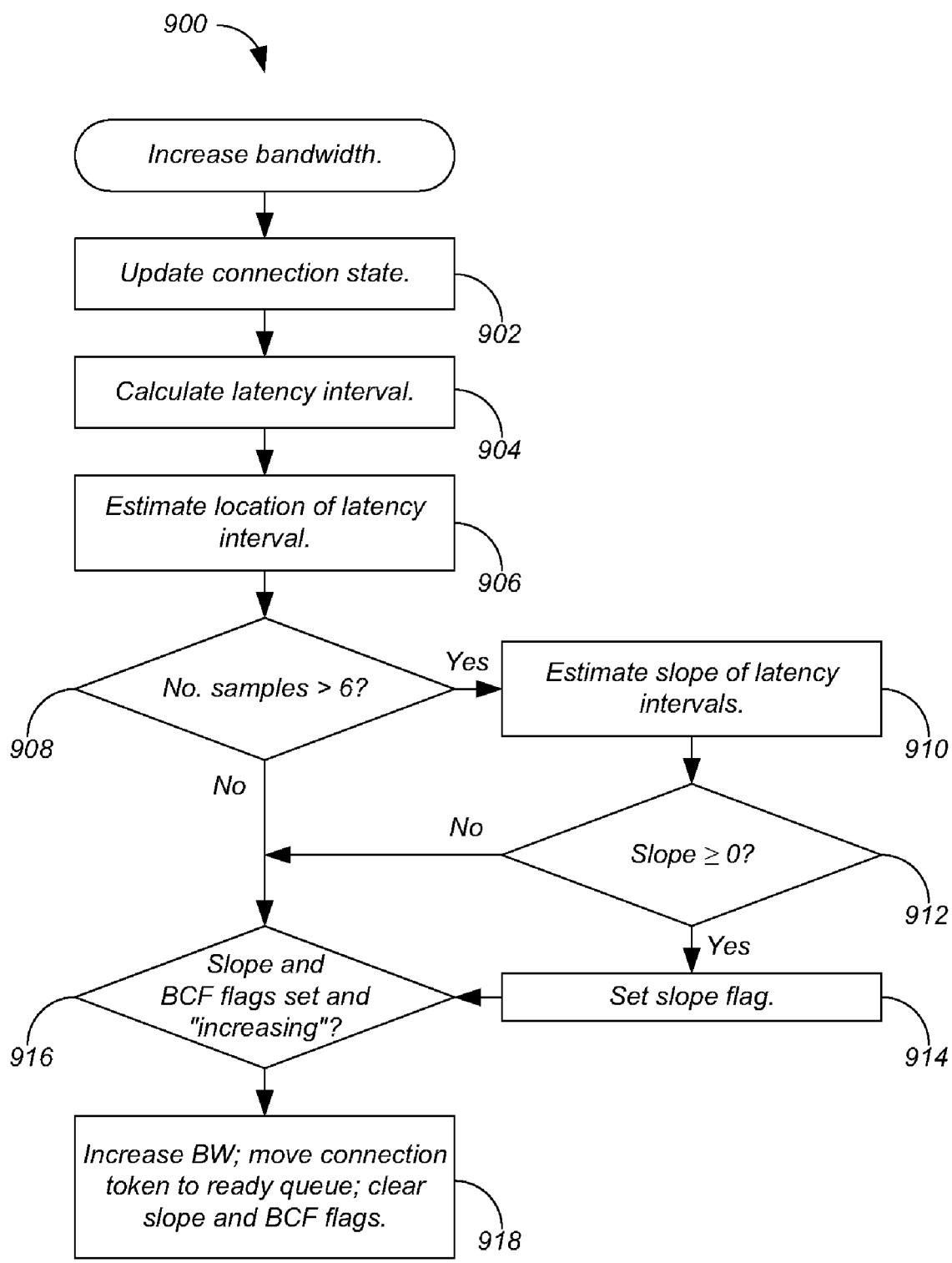
FIG. 9 shows a process for attempting to increase the bandwidth of a connection according to some embodiments of the present invention.

When videoconferencing system 100 receives a packet timing report for a connection, as described above, controller 120 attempts to increase the bandwidth of the connection. FIG. 9 shows a process 900 for attempting to increase the bandwidth of a connection according to some embodiments of the present invention. Referring to FIG. 9, controller 120 first updates the state of the connection (step 902), for example as described above with respect to FIG. 6.

Controller 120 also calculates a latency interval based on the packet timing report (step 904), for example as described above with respect to FIG. 8. Controller 120 estimates a location of the latency interval based on a history of the latency intervals for the connection (step 906), for example using a median, kernel density function, or the like.

If the history of the latency intervals for the connection is sufficient, for example comprising more than six samples (step 908), controller 120 estimates a slope of the latency intervals (step 910). If the slope is greater than, or equal to, zero (step 912), indicating that the latency intervals are increasing, controller 120 sets a slope flag in memory 122 (step 914).

If both the slope flag and the BCF flag are set, and if the connection state is "increasing" (step 916), controller 120 increases the bandwidth for the connection, moves the connection token 210 for the connection to ready connection queue 202, and clears both the slope flag and the BCF flag (step 918).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus for managing bandwidth for a plurality of connections each having a respective connection token, the apparatus comprising:

a memory to store the connection tokens, the memory comprising a ready connection queue, a pending increase connection queue, and an increase connection queue; and a controller to move connection tokens in the ready connection queue to the pending increase connection queue when bandwidth for the respective connections should be increased;

wherein the controller moves connection tokens in the pending increase connection queue to the increase connection queue, and increases bandwidth for the respective connections, when a number of the connection tokens in the increase connection queue is less than a predetermined maximum number; and wherein the controller moves connection tokens in the increase connection queue to the ready connection queue when bandwidth for the respective connections should be decreased.

2. The apparatus of claim 1:

wherein the memory stores priority levels for each of the connections; and wherein the controller moves the connection tokens based on the priority levels of the respective connections.

3. The apparatus of claim 1:

wherein the controller decreases bandwidth, and moves connection tokens to the ready connection queue, when the respective connections are congested.

4. The apparatus of claim 3:
wherein the controller determines whether the connections are congested.

5. The apparatus of claim 4:
wherein, to determine whether one of the connections is congested, the controller transmits, over the one of the connections, a pair of packets separated by a first interval; and
wherein the controller determines a second interval between reception of the pair of packets, determines a difference between the first and second intervals, and determines a congestion level based on the difference.

6. An apparatus for managing bandwidth for a plurality of connections each having a respective connection token, the apparatus comprising:
memory means for storing the connection tokens, the memory comprising a ready connection queue, a pending increase connection queue, and an increase connection queue; and
controller means for moving connection tokens in the ready connection queue to the pending increase connection queue when bandwidth for the respective connections should be increased;
wherein the controller means moves connection tokens in the pending increase connection queue to the increase connection queue, and increases bandwidth for the respective connections, when a number of the connection tokens in the increase connection queue is less than a predetermined maximum number; and
wherein the controller means moves connection tokens in the increase connection queue to the ready connection queue when bandwidth for the respective connections should be decreased.

7. The apparatus of claim 6:
wherein the memory means stores priority levels for each of the connections; and
wherein the controller means moves the connection tokens based on the priority levels of the respective connections.

8. The apparatus of claim 6:
wherein the controller means decreases bandwidth, and moves connection tokens to the ready connection queue, when the respective connections are congested.

9. The apparatus of claim 8:
wherein the controller means determines whether the connections are congested.

10. The apparatus of claim 9:
wherein, to determine whether one of the connections is congested, the controller means transmits, over the one of the connections, a pair of packets separated by a first interval; and
wherein the controller means determines a second interval between reception of the pair of packets, determines a difference between the first and second intervals, and determines a congestion level based on the difference.

11. A method for managing bandwidth for a plurality of connections each having a respective connection token, the method comprising:
providing a ready connection queue, a pending increase connection queue, and an increase connection queue;
moving connection tokens in the ready connection queue to the pending increase connection queue when bandwidth for the respective connections should be increased;
moving connection tokens in the pending increase connection queue to the increase connection queue, and increasing bandwidth for the respective connections, when a number of the connection tokens in the increase connection queue is less than a predetermined maximum number; and
moving connection tokens in the increase connection queue to the ready connection queue when bandwidth for the respective connections should be decreased.

12. The method of claim 11, further comprising:
maintaining priority levels for each of the connections; and
moving the connection tokens based on the priority levels of the respective connections.

13. The method of claim 11, further comprising:
decreasing bandwidth, and moving connection tokens to the ready connection queue, when the respective connections are congested.

14. The method of claim 13, further comprising:
determining whether the connections are congested.

15. The method of claim 14, further comprising:
causing transmission, over one of the connections, of a pair of packets separated by a first interval; and
determining a second interval between reception of the pair of packets; and
determining a difference between the first and second intervals.

16. Computer-readable media embodying instructions executable by a computer to perform a method for managing bandwidth for a plurality of connections each having a respective connection token, the method comprising:
providing a ready connection queue, a pending increase connection queue, and an increase connection queue;
moving connection tokens in the ready connection queue to the pending increase connection queue when bandwidth for the respective connections should be increased;
moving connection tokens in the pending increase connection queue to the increase connection queue, and increasing bandwidth for the respective connections, when a number of the connection tokens in the increase connection queue is less than a predetermined maximum number; and
moving connection tokens in the increase connection queue to the ready connection queue when bandwidth for the respective connections should be decreased.

17. The computer-readable media of claim 16, wherein the method further comprises:
maintaining priority levels for each of the connections; and
moving the connection tokens based on the priority levels of the respective connections.

18. The computer-readable media of claim 16, wherein the method further comprises:
decreasing bandwidth, and moving connection tokens to the ready connection queue, when the respective connections are congested.

19. The computer-readable media of claim 18, wherein the method further comprises:
determining whether the connections are congested.

20. The computer-readable media of claim 19, wherein the method further comprises:
causing transmission, over one of the connections, of a pair of packets separated by a first interval; and
determining a second interval between reception of the pair of packets; and
determining a difference between the first and second intervals.

* * * * *